No. 631,648. Patented Aug. 22, 1899.
R. G. LOCKWOOD.
GRIP.
(Application filed June 21, 1899.)
(No Model.)
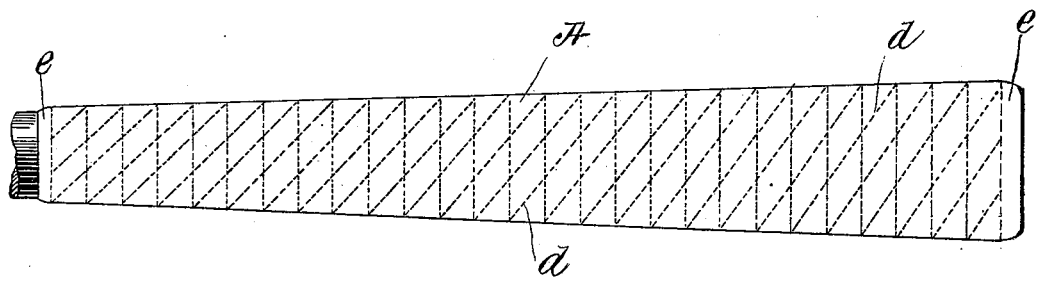
Fig-1-
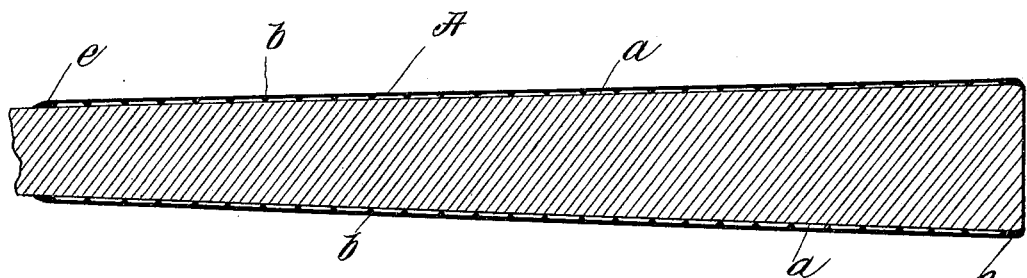
Fig-2-
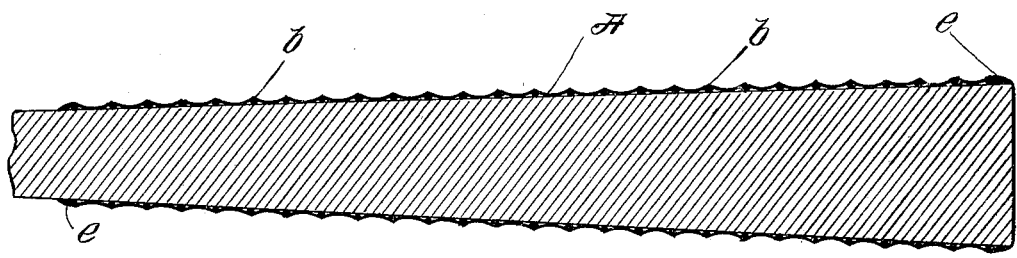
Fig-4-   Fig-3-
WITNESSES
Wm. H. Varnum
A. W. Hamblen
INVENTOR
Rhodes G. Lockwood
by his atty,
O. R. Mitchell.

UNITED STATES PATENT OFFICE.

RHODES G. LOCKWOOD, OF BOSTON, MASSACHUSETTS.

GRIP.

SPECIFICATION forming part of Letters Patent No. 631,648, dated August 22, 1899.

Application filed June 21, 1899. Serial No. 721,299. (No model.)

*To all whom it may concern:*

Be it known that I, RHODES G. LOCKWOOD, of Boston, in the county of Suffolk and State of Massachusetts, have invented an Improved Grip for Golf-Clubs and the Like, of which the following is a specification, reference being had to the accompanying drawings, in which—

Figure 1 is a side elevation of the handle of a golf-club, with my grip in place, the interior cells being indicated by dotted lines. Fig. 2 is a central longitudinal section of Fig. 1. Fig. 3 is the same as Fig. 2, but shows the grip after it has been used sufficiently to express the air from the cells. Fig. 4 is a section, upon an enlarged scale, through rib $b$.

The object of my invention is to provide the handles of golf-clubs and the like with a soft and conformable grip to enable a better hold of the club to be secured by the user.

It has been usual heretofore to supply the handles of golf-clubs and the like with a covering of soft rubber in order to improve the grasp of the player in using them, and it has also been customary to roughen the outer surface of this grip by corrugating it or by making raised parts and depressions of suitable size and shape; but these grips heretofore used have not been altogether satisfactory. It will be obvious that in order to be serviceable the grip must be firmly connected to the handle it covers in order that in use the golf-club may not turn inside the grip. To effect this, the grips heretofore in use have been made considerably smaller in interior diameter than the handle they were intended to be applied to was in exterior diameter. When, therefore, the rubber grip was applied, it made considerable stretch, and as it was soft it naturally adhered at first to the club-handle very firmly; but, as is well known, if rubber is kept continuously under stretch its elasticity gradually weakens and breaks down, and in the case of rubber grips applied to golf-club handles the grip before long conformed itself to the handle upon which it was stretched and ceased to tightly hug the same, and this conforming and loss of elasticity took place long before the grip was deteriorated in any way from the other causes which affect the life of rubber.

It is to overcome the difficulties and disadvantages above set forth and at the same time to provide a grip more firm and soft to the hand and more closely adherent to the club-handle than those heretofore known that I have devised my improved grip.

My improved grip might well be called a "vacuum-grip," as that is the principle upon which it works. Instead of making the grip considerably smaller in interior diameter than the exterior diameter of the handle of which it is to be applied I make the interior diameter of the grip only a trifle less than that of the handle of the club. The inside of the grip A is formed into a multitude of depressions $a$ by means of a multiplicity of ribs $b$, running around inside the grip, and other ribs $d$ running crosswise of the ribs $b$. These ribs are preferably V-shaped in cross-section and are perhaps one thirty-second of an inch in height. The tubular body of the grip is of thin soft rubber. At either end of the grip is a beveled annular edge $e$, shaped generally as shown in the drawings and with the thin edge of the bevel against the handle of the club.

The mode of operation is as follows: The grip is placed in position upon the handle of the golf-club, the ribs $b$ upon the inside and resting against the surface of the handle of the club. It will be obvious that when thus coöperating with the club-handle a multiplicity of cells are formed, the grip forming five sides of each cell and the club-handle the sixth side. The grip being placed upon the handle it is rolled or pressed upon the outside from end to end or from middle to each end and the air in any given cell is pressed from cell to cell until it is finally expelled from between the grip and the club-handle, the beveled edge of the grip at the end yielding outward to permit the escape of air under pressure. As a practical matter most players do not take much trouble over this expulsion of air, trusting at first to the natural adhesiveness of the new rubber for the security of the grip upon the handle and allowing the expulsion to be effected gradually by the hand of the player in actual use. The result of expulsion of air from the cells is that a partial vacuum is formed and the thin rubber forming the outer wall of the cell is pressed against the handle. (See Fig. 3.) It will be clear that this pressure of the outside air is permanent. It will be clear also that the pressure of the hands in using the club will be concentrated upon the ribs, which will be pressed hard against the club-handle, owing to the fact that all the pressure of the player's hands is concentrated upon the ribs. It will be clear also that the pitting of the outer surface of the grip by atmospheric pressure leaves an agreeably rough handhold, the outer or large part of the ribs presenting themselves to the hands and taking the pressure therefrom.

The result of my construction is a grip soft, yet firm, and when in use firmly connected to the handle of the club, while not unduly stretched. Such a grip, while no more expensive to make, is longer lived than any heretofore made and the cellular construction renders it much more easy and secure to firmly grasp and hold.

What I claim is—

As a new article of manufacture, the grip or holdfast above described, made of material impervious to air and suitably flexible, elastic and resilient, formed as a tube and having a multiplicity of crossed ribs within the same, raised above the surface of the inside of the tube.

RHODES G. LOCKWOOD.

Witnesses:
OLIVER R. MITCHELL,
EVERETT E. KENT.